United States Patent [19]

Kupersmit

[11] 4,411,373
[45] Oct. 25, 1983

[54] FOLDABLE REINFORCING ELEMENT FOR SHIPPING CONTAINERS

[76] Inventor: Julius B. Kupersmit, 145-228th St., Springfield Gardens, N.Y. 11413

[21] Appl. No.: 434,492

[22] Filed: Oct. 15, 1982

[51] Int. Cl.³ .................. B65D 5/36; B65D 5/56
[52] U.S. Cl. ........................ 220/470; 206/591; 220/410; 220/441; 229/23 BT; 229/41 R
[58] Field of Search ............ 220/470, 445, 441, 443, 220/410, 468; 206/591, 594, 814; 229/23 BT, 41 R, 41 B

[56] References Cited

U.S. PATENT DOCUMENTS

| | | | |
|---|---|---|---|
| 1,624,360 | 4/1927 | Oppenheim | 206/591 |
| 2,609,136 | 9/1952 | Sider | 206/591 X |
| 2,961,141 | 11/1960 | Lukes | 206/591 X |
| 3,782,619 | 1/1974 | Dittbenner | 229/41 R X |

Primary Examiner—Allan N. Shoap
Attorney, Agent, or Firm—Charles E. Temko

[57] ABSTRACT

A foldable reinforcing element or liner for use with collapsible reusable shipping containers to provide increased resistance to bulging or bursting. The element is formed of two pieces of single or multiple ply corrugated material overlapped at a pair of oppositely disposed end walls and glued in such manner as to provide a solid wall panel overlying a second panel having a vertical fold line. When in erected condition, the overlapping walls also provide improved compression strength in the plane thereof.

2 Claims, 6 Drawing Figures

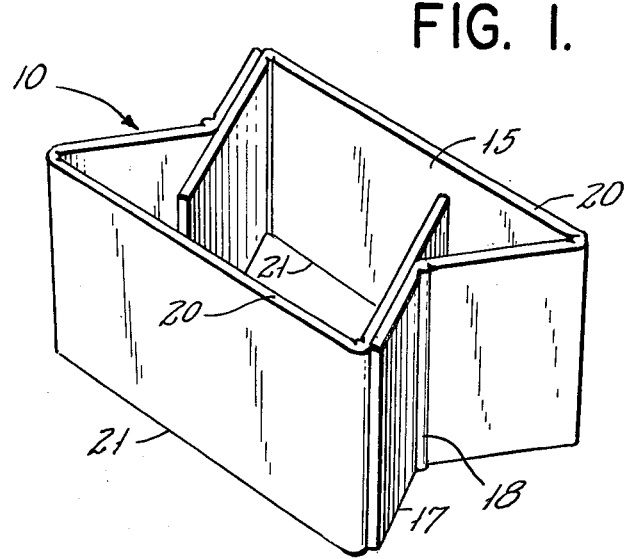
FIG. 1.
FIG. 2.
FIG. 4.
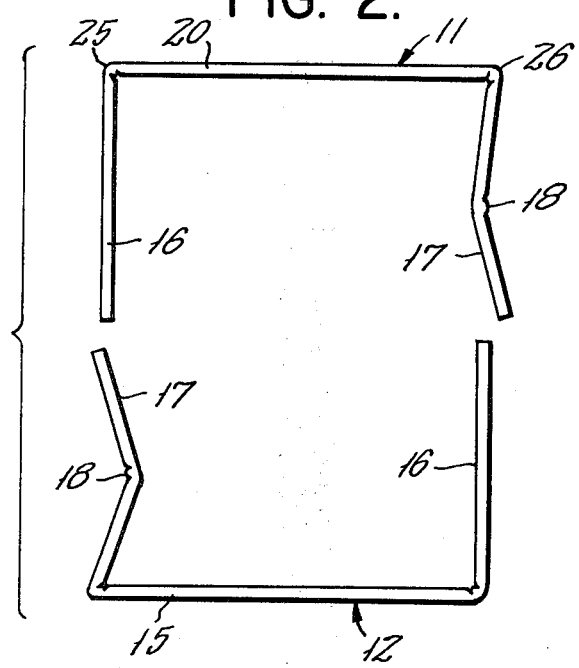
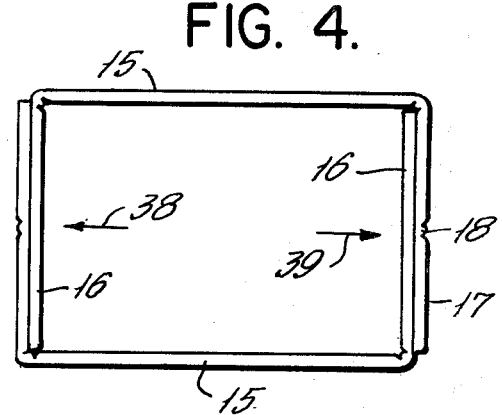
FIG. 5.
FIG. 3.
FIG. 6.
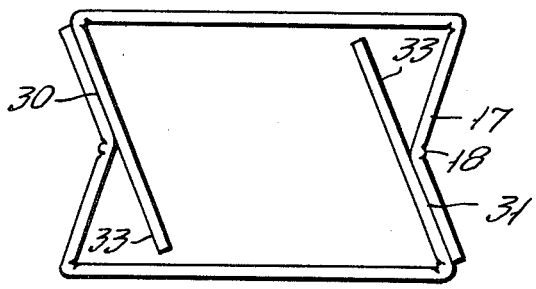
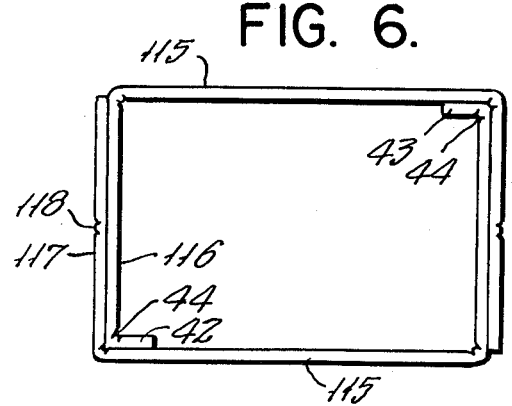

FOLDABLE REINFORCING ELEMENT FOR SHIPPING CONTAINERS

BACKGROUND OF THE INVENTION

This invention relates generally to the field of collapsible reusable shipping containers of types commonly used for transporting bulk and particulate materials, and more particularly to an improved reinforcing insert for use in conjunction therewith. Containers of this general type are well known in the art, as are corresponding reinforcing inserts therefor, and the invention lies in specific constructional details which permit the obtaining of increased mechanical strength and bursting resistance without corresponding increase in weight and materials. Mention is made of my prior U.S. Pat. Nos. 3,443,737, granted Apr. 13, 1969; and 4,252,266, granted Feb. 24, 1981. Particular reference is made to my copending application, Ser. No. 06/257,106 (now U.S. Pat. No. 4,358,049).

Shipping containers of this type are primarily used for air and truck transport, where space and weight considerations are of greater importance than the cost of fabrication. In the latter of my above mentioned patents, there is disclosed an improved form in which the conventional wood or synthetic resinous pallet has been substituted by an integral base element which not only saves a substantial amount of cargo space in the transporting vehicle, but provides a degree of rigidity to the device which is more than adequate for most loads provided that the container is not of excessive size.

While the base element provides such rigidity as a result of the gluing of foldable tabs integrally formed with the lower edges of the side walls, and the side walls themselves possess substantial tensil and compressive strength in the plane thereof, when such devices are used for the transportation of relatively heavy particulate loads, the side walls of the container do not always exhibit the desired degree of resistance to outward bulging in response to stresses exerted by the load in planes normal to the planes of the side wall. Under such circumstances, it is possible to increase the thickness of the side walls. However, where more than two plys of corrugation are involved, it becomes increasingly difficult to fold the walls in a manner necessary to place the container in collapsed condition for return to the shipping source. The above mentioned copending application disclosed a collapsible reinforcing element or liner which can be separated from the main body of the container to provide, in a separable, foldable element the necessary additional mechanical strength. However, the disclosed liner is formed of three or more plys of corrugated material, and is not without substantial thickness and weight. With ever increasing freight tariffs, there has been a growing need for lighter weight reinforcing or liner elements which provide substantially the same degree of mechanical strength.

SUMMARY OF THE INVENTION

Briefly stated, the invention contemplates the provision of an improved reinforcing or liner element of the class described which, using relatively lightweight materials, will provide required bulge resisting and burst strengths with a complete absence of exposed fold lines in the surface facing the enclosed cargo. This is accomplished by providing a liner formed from a pair of folded blanks each forming a side wall and attached end walls. One end wall of each blank is transversely creased to form a fold line, and that portion thereof lying outwardly of the fold line is glued to a corresponding area on an end wall of the opposed blank. As a consequence, when the element is folded to collapsed, substantially planar condition, the folding is accomplished at the above mentioned fold lines and at the corners interconnecting the side and end walls, without bending the rigid end walls which overlie the folded end walls to which they are glued.

BRIEF DESCRIPTION OF THE DRAWING

In the drawing, to which reference will be made in the specification, similar reference characters have been employed to designate corresponding parts throughout the several views.

FIG. 1 is a perspective view of a first embodiment of the invention, in partially erected condition.

FIG. 2 is an exploded top plan view thereof.

FIG. 3 is a top plan view thereof corresponding to the structure shown in FIG. 1.

FIG. 4 is a top plan view thereof similar to that shown in FIG. 3, but showing the embodiment in fully erected condition.

FIG. 5 is a top plan view thereof, showing the embodiment in fully collapsed condition.

FIG. 6 is a top plan view corresponding to that seen in FIG. 4, but showing a second embodiment of the invention.

DETAILED DESCRIPTION OF THE DISCLOSED EMBODIMENTS

In accordance with the first embodiment of the invention, the device, generally indicated by reference character 10, comprises broadly: first and second substantially similar wall elements 11 and 12, respectively (see FIG. 2).

Each of the wall elements 11–12 includes a side wall panel 15 adapted to be disposed within the longer side wall of a container, (not shown), a solid end wall 16, and a creased end wall 17 having a generally transversely disposed fold line 18.

Referring to FIGS. 1 and 2, each of the elements 11–12 is bounded by a continuous upper edge 20, a continuous lower edge 21, and end edges 22 and 23. The side walls 15 are interconnected to the end walls 16 and 17 by first and second fold lines 25 and 26. Each of the end walls 17 is provided with an additional fold line 26, generally medially disposed, and extending between the upper and lower edges 20 and 21.

FIG. 3 illustrates the manner in which the interconnected areas 30 and 31 are positioned relative to the unglued areas 32 and 33, in such manner that when the device 10 is moved to collapsed condition, the solid end wall panels 16 are moved to generally juxtaposed relation with respect to the plane of the side wall panels 15 without being subject to stress normal to the plane of the panels. When in fully erected condition, as seen in FIG. 4 in the drawing, the solid end wall panels 16 face the cargo, and present no line of weakness to the stresses indicated by the arrows 38 and 39 as is common in the case of a shifting or particulate load. The absence of a fold line in these panels also adds significantly to the compressive strength of the erected liner, as is called into play when a plurality of containers (not shown) are placed in loaded stacked condition.

Turning now to the second embodiment of the invention, as illustrated in FIG. 6 in the drawing, parts corresponding to those of the first embodiment have been designated by similar reference characters with the additional prefix "1", thereby avoiding needless repetition.

The second embodiment differs from the first embodiment in the provision of additional terminal flap member 42 and 43 attached to each of the creased end wall panels 117, to provide additional reinforcement at two of the corners of the container. The members 42 and 43 are attached at the free edges of the panels 117 by ninety degree fold lines 44, and, thus, form part of the unglued areas of the creased end wall panels. When folded to a collapsed condition similar to that shown in FIG. 5, the members 42 and 43 tend to flatten toward a condition coplanar with the walls to which they are attached, and without any interference.

I wish it to be understood that I do not consider the invention limited to the precise details of structure shown and set forth in this specification, for obvious modifications will occur to those skilled in the art to which the invention pertains.

I claim:

1. An improved foldable reinforcing liner for use with a collapsible reusable shipping container comprising: first and second wall elements, each of said wall elements including a side wall and first and second end walls interconnected to said side wall at opposite ends thereof, said end walls being foldably positioned at substantially a right angle relative to a respective side wall; said first end walls of each of said wall elements having a generally medially positioned transversely extending fold line, said second end walls thereof being rigid; said wall elements being mutually interconnected such that a first end wall of one element is glued to a second end wall of the other element only in an area of said first end wall extending outwardly of said fold line; whereby said liner may be folded when not in use, from a generally rectangular configuration to a generally planar condition without disturbing the planar condition of said second end walls.

2. An improved liner as set forth in claim 1, further characterized in each of said first end walls having a flap member foldably interconnected to a distal end thereof to further reinforce a pair of diagonally disposed corners of said liner when in erected condition.